United States Patent [19]

Söllradl et al.

[11] Patent Number: 5,922,799
[45] Date of Patent: Jul. 13, 1999

[54] ORGANOPOLYSILOXANE COMPOSITIONS WHICH CAN BE CROSSLINKED TO GIVE FLAME-RESISTANT ELASTOMERS

[75] Inventors: Herbert Söllradl, Emmerting; Alfred Kurz, Burghausen; Gerhard Balk, Burgkirchen, all of Germany

[73] Assignee: Wacker-Chemie GmbH, Munich, Germany

[21] Appl. No.: 08/805,088

[22] Filed: Feb. 24, 1997

[30] Foreign Application Priority Data

May 23, 1996 [DE] Germany ............... 196 20 816

[51] Int. Cl.[6] ...................................... C08K 3/38
[52] U.S. Cl. .................. 524/404; 521/85; 524/413; 524/437; 524/424; 524/780; 524/701; 524/783
[58] Field of Search .................... 524/404, 413, 524/437, 424, 780, 783, 701; 521/85

[56] References Cited

U.S. PATENT DOCUMENTS

| | | |
|---|---|---|
| 3,652,488 | 3/1972 | Harder et al. . |
| 3,677,999 | 7/1972 | Hans Denk et al. . |
| 3,821,140 | 6/1974 | Milbert . |
| 4,176,093 | 11/1979 | Zoch . |
| 4,405,425 | 9/1983 | Schiller et al. . |
| 4,433,069 | 2/1984 | Harper ................... 521/103 |
| 4,460,761 | 7/1984 | Schiller et al. . |
| 4,694,030 | 9/1987 | von Bonin et al. . |
| 5,262,454 | 11/1993 | Leroux et al. . |

FOREIGN PATENT DOCUMENTS

| | | |
|---|---|---|
| 0040750 | 8/1984 | European Pat. Off. . |
| 0110370 | 4/1987 | European Pat. Off. . |
| 0505940 | 9/1992 | European Pat. Off. . |
| 2034919 | 7/1975 | Germany . |
| 2300504 | 4/1977 | Germany . |
| 2909462 | 5/1981 | Germany . |
| 3041031 | 6/1982 | Germany . |
| 3602888 | 8/1987 | Germany . |
| 4013161 | 11/1991 | Germany . |

OTHER PUBLICATIONS

Dewent Abstract Corresponding To Jp 51 045 145 (#76–41127X) XP 002037346 (Apr. 1976).

*Primary Examiner*—Melvyn I. Marquis
*Attorney, Agent, or Firm*—Brooks & Kushman P.C.

[57] ABSTRACT

The use is described of boron compounds chosen from the group consisting of boron carbide and metal borides mixed with non-reinforcing fillers, with the proviso that at least 75% by weight of the non-reinforcing fillers are heat-stable up to 1200° C., as flameproofing agents in organopolysiloxane compositions which can be crosslinked to flame-resistant elastomers.

19 Claims, 1 Drawing Sheet

ORGANOPOLYSILOXANE COMPOSITIONS WHICH CAN BE CROSSLINKED TO GIVE FLAME-RESISTANT ELASTOMERS

BACKGROUND OF THE INVENTION

According to U.S. Pat. No. 3,652,488 and the corresponding DE-C 20 34 919, flame resistance is obtained by addition of platinum and the flame-resistant characteristic is enhanced by addition of carbon black. As a result, these compositions are naturally black. The pale shades so often desired for joint-sealing compositions cannot be produced.

U.S. Pat. No. 3,821,140 and the corresponding DE-C 23 00 504 and U.S. Pat. No. 3,677,999 describe flame-resistant or self-extinguishing compositions which are prepared by addition of metal oxides or hydrates of metal oxides, such as hydrated aluminum oxide. At elevated temperatures in the course of a fire, water is split off from these products, and although this briefly reduces flammability, under the elevated temperatures which occur during a more prolonged fire it contributes toward destabilization of the dimethylpolysiloxane by hydrolysis. On dissociation, basic oxides, such as magnesium oxide or aluminum oxide, are formed from these hydrates of metal oxides, and intensify the decomposition under these conditions. The silicone matrix then disintegrates completely due to depolymerization. Combinations of metal oxides/hydrated metal oxides with graphite are known from U.S. Pat. No. 4,405,425 and corresponding EP-B 40 750.

According to DE-B 29 09 462 and DE-A 30 41 031, flame-resistant polysiloxane compositions are prepared by addition of halogenated diphenyl compounds, for example octabromodiphenyl ether. In the event of a fire however, polyhalogenated dibenzofurans or dibenzodioxins are formed from these products, and these are undesirable because of the known toxicological problems. The use of these products might therefore be possible to only a limited extent in future.

None of the above mentioned methods lead to products which increase in volume in the event of a fire and thus show a so-called intumescence effect According to U.S. Pat. No. 5,262,454 and corresponding DE-A 40 13 161 and U.S. Pat. No. 4,694,030 and corresponding DE-A 36 02 888, this can be achieved by addition of expandable graphite compounds and other additives, such as nitrogen-containing polyphosphates, or by hollow glass beads. However, because of the presence of graphite, the products are black and no pale shades can be produced. Furthermore, the surfaces of the silicone compositions are rough and unattractive due to the addition of the expandable graphite or the hollow glass beads, because these products are not available in the necessary small particle sizes (less than 20 $\mu$m).

Boron compounds are used in silicone compositions because of their neutron-absorbing action. The use of boron carbide for this purpose is known from U.S. Pat. No. 4,176,093.

BRIEF SUMMARY OF THE INVENTION

The present invention relates to the use of boron compounds chosen from the group consisting of boron carbide and metal borides mixed with non-reinforcing fillers, with the proviso that at least 75% by weight of the non-reinforcing fillers are heat-stable up to 1200° C., as flame-proofing agents in organopolysiloxane compositions which can be crosslinked to flame-resistant elastomers.

BRIEF DESCRIPTION OF THE DRAWING

In FIG. 1

Figure 1:
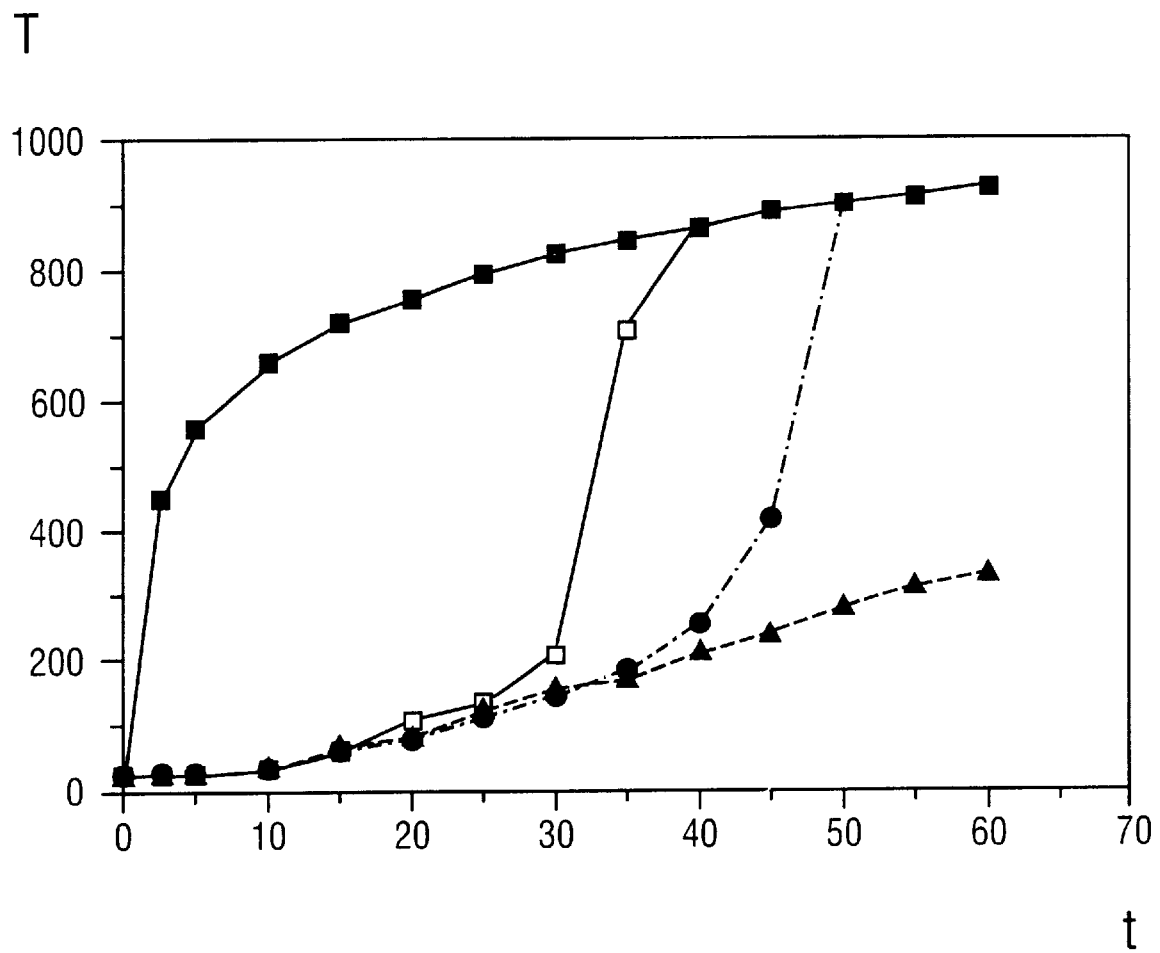
FIG. 1 is a graph plotting the results of examples 1 through 4, according to the invention and comparison examples 1 through 5.

T is temperature in ° C.

t is duration of experiment in minutes

■-the theoretical temperature of the furnace

▲-is examples 1, 2, 3 and 4

●-is Comparison Experiments 1, 2, 3 and 5

□-is Comparison Experiment 4

DETAILED DESCRIPTION OF THE INVENTION

One object of the present invention was to provide organopolysiloxane compositions which can be crosslinked to flame-resistant elastomers and the disadvantages which occur in the prior art are avoided in the event of a fire. A further object was to provide organopolysiloxane compositions which can be crosslinked to flame-resistant elastomers and in which the intrinsic color should be as light as possible, and with which elastomers are obtained which, in the event of a fire, increase their volume by foaming, where the foam should be as mechanically stable as possible, and should seal the joints as tightly as possible and have a thermal insulation action which should delay an increase in temperature on the reverse of the component facing the fire for as long as possible. The object is achieved by the invention.

Examples of boron compounds are boron carbide, zinc boride, aluminum boride, titanium boride and calcium boride.

One type of boron compound can be used, however it is possible to use a mixture of at least two boron compounds.

The predominant content of the non-reinforcing fillers having a specific BET surface area of less than 50 m$^2$/g, must be stable at the fire temperatures which usually occur, so that there is no decomposition with loss in volume or a destabilization of the organopolysiloxane matrix owing to the formation of undesirable reaction products. Unsuitable fillers are calcium sulfate and hydrated oxides of aluminum or magnesium, in which case undesirable reaction products are water in the form of steam and also alkaline oxides, which are formed during the decomposition.

A content of calcium carbonate or calcium-magnesium carbonate, which split off carbon dioxide with a loss in volume, of up to 25% by weight of the total amount of non-reinforcing fillers is possible.

Preferably non-reinforcing fillers which are used are only those which are heat-stable up to 1200° C.

Examples of non-reinforcing fillers which are heat-stable up to 1200° C. are naturally occurring and synthetic silicon dioxides, such as diatomaceous earth, amorphous and crystalline quartzes, silicates, such as mica, kaolin, talcs and perlites, silicatic fillers and naturally occurring and precipitated barium sulfate. One type of filler can be used, however it is possible to use a mixture of at least two fillers.

As a result of the thermal decomposition of organopolysiloxane compositions from a temperature of about 400° C., gaseous low molecular weight organosilicon compounds form, which lead to expansion of the silicone elastomers when they escape. Without the additions according to the invention, the organopolysiloxane matrix would decompose completely in the course of the fire. As a result of the additions according to the invention, a solid, foam-like residue is formed. The silicon dioxide formed during thermal decomposition of the organopolysiloxane and the additions according to the invention sinter to form a mechanically resistant foam. The low molecular weight compounds which form during decomposition of the organopolysiloxane act as blowing agents. Additional blowing agents are not necessary. In the event of a fire, this foam-like residue also shows an improved insulating action with respect to non-foaming joint compositions, and can be subjected to mechanical stress, in contrast to non-foaming joint compositions, which decompose to form a pulverulent residue which cannot be subjected to mechanical stress. A loss in volume and cracking in the remaining joint compositions are avoided, so that no fire gases reach the reverse of the sealed-off structural components and spreading of the fire is therefore avoided.

The organopolysiloxane compositions which comprise the additions according to the invention include so-called condensation-crosslinking 1-component compositions and 2-component compositions and addition-crosslinking 2-component compositions based on organopolysiloxanes.

The organopolysiloxane compositions without the additions according to the invention are the same organopolysiloxane compositions which have been possible to use for the organopolysiloxane compositions known to date which can be crosslinked to flame-resistant elastomers.

The organopolysiloxanes in the compositions according to the invention can be any desired organopolysiloxanes which have been present in the organopolysiloxane compositions known to date which can be crosslinked to flame-resistant elastomers.

The condensation-crosslinking compositions are preferably organopolysiloxanes which contain end groups which are capable of condensation, of the formula $$XR_2SiO(R_2SiO)_nSiR_2X \qquad (I)$$

in which
R is identical or different monovalent, optionally substituted hydrocarbon radicals having 1 to 18 carbon atoms per radical,
X is a hydroxyl group and
n is an integer of at least 10.

Optionally, all or some of the hydroxyl groups X in above mentioned formula (I) can be replaced by other groups which are capable of condensation, such as alkoxy groups having 1 to 4 carbon atoms per group.

The addition-crosslinking compositions are preferably organopolysiloxanes which contain aliphatic carbon—carbon multiple bonds, of the formula $$Y_aR^1_{3-a}SiO(R^1_2SiO)_b(R^1YSiO)_cSiR^1_{3-a}Y_a \qquad (II)$$

in which
$R^1$ is identical or different, monovalent, optionally substituted hydrocarbon radicals having 1 to 18 carbon atoms per radical,
Y is a monovalent hydrocarbon radical with an aliphatic carbon—carbon multiple bond, preferably an alkenyl radical, more preferably a vinyl or hexenyl radical, and
a is 0 or 1,
b is an integer having a value from 20 to 10,000 and
c is 0 or an integer having a value from 1 to 300.

In addition to the diorganosiloxane units $R_2SiO$, other siloxane units can also be present within or along the siloxane chain of the organopolysiloxanes of the above mentioned formulae (I) and (II) which is usually not shown by such formulae. Examples of such other siloxane units, which are usually present only as an impurity, are those of the formulae $R_2SiO_{3/2}$, $R_3SiO_{1/2}$ and $SiO_{4/2}$, where R has the meaning given above for this radical.

One type of organopolysiloxane or several types of organopolysiloxanes can be used.

The organopolysiloxanes have a viscosity of 1000 to 300,000 mPa•s at 25° C., preferably 6000 to 300,000 mPa•s at 25° C., and more preferably 20,000 to 300,000 mPa•s at 25° C.

Examples of radicals R are alkyl radicals, such as the methyl, ethyl, n-propyl, iso-propyl, n-butyl, iso-butyl, tert-butyl, n-pentyl, iso-pentyl, neo-pentyl and tert-pentyl radical; hexyl radicals, such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; and octadecyl radicals, such as the n-octadecyl radical; alkenyl radicals, such as the vinyl and the allyl radical; cycloalkyl radicals, such as cyclopentyl, cyclohexyl and cycloheptyl radicals and methylcyclohexyl radicals; aryl radicals, such as the phenyl, naphthyl, anthryl and phenanthryl radical; alkaryl radicals, such as o-, m- and p-tolyl radicals, xylyl radicals and ethylphenyl radicals; and aralkyl radicals, such as the benzyl radical and the α- and the β-phenylethyl radical.

Examples of substituted radicals R are cyanoalkyl radicals, such as the β-cyanoethyl radical, and halogenated hydrocarbon radicals, for example haloalkyl radicals, such as the 3,3,3-trifluoro-n-propyl radical, the 2,2,2',2',2'-hexafluoro-isopropyl radical and the heptafluoroisopropyl radical, and haloaryl radicals, such as the o-, m- and p-chlorophenyl radical.

With the exception of the alkenyl radicals, the examples of radicals R also apply to the radicals $R^1$. Examples of substituted radicals R apply in their full scope to substituted radicals $R^1$.

Because of easier accessibility alone, at least 50%, preferably at least 90%, of the number of radicals R and $R^1$ in the organopolysiloxanes are preferably methyl radicals.

Crosslinking agents which are used for crosslinking the condensation-crosslinking organopolysiloxanes are preferably moisture-sensitive silanes of the formula $$R_xSiZ_{4-x} \qquad (III)$$

and/or partial hydrolysates thereof, which preferably contain 2 to 10 silicon atoms, in which
R has the meaning given above,
x is 0 or 1 and
Z is identical or different hydrolyzable groups chosen from the group consisting of
acyloxy groups —$OCOR^2$
optionally substituted hydroxycarbonoxy groups —$OR^3$
amino groups —$NR^4_2$
oxime groups —ON=A
amide groups

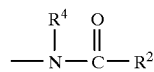

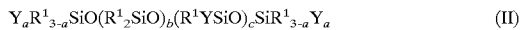

aminoxy groups —O—NR⁴₂
enoxy groups

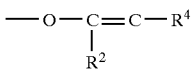

in which
R² is a monovalent hydrocarbon radical having 1 to 12 carbon atoms,
R³ is a monovalent hydrocarbon radical having 1 to 4 carbon atoms,
R⁴ is hydrogen or identical or different, monovalent hydrocarbon radicals having 1 to 12 carbon atoms and
A is identical or different radicals of the formula

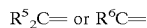

in which
R⁵ is identical or different, monovalent hydrocarbon radicals having 1 to 5 carbon atoms per radical and
R⁶ is a divalent hydrocarbon radical having 5 to 6 carbon atoms per radical.

Examples of acyloxy groups are acetoxy and formyloxy groups and 2-ethyl-hexanoyloxy groups.

Examples of hydrocarbonoxy groups are methoxy, ethoxy, n-propyloxy, isopropyloxy and n-butyloxy groups.

Examples of substituted hydrocarbonoxy groups are hydrocarbonoxy groups which are substituted by alkoxy groups, such as methoxyethylenoxy, ethoxyethylenoxy and methoxyisopropylenoxy groups.

Examples of amino groups are n-butylamino, sec-butylamino and cyclohexylamino groups.

Examples of oxime groups are methyl ethyl ketoxime groups, methyl isobutyl ketoxime groups, methyl n-amyl ketoxime groups and dimethyl ketoxime groups.

Examples of amide groups are N-methylbenzamido groups and N-methyl-acetamido groups.

An example of an aminoxy group is the hydroxylamine group.

An example of an enoxy group is the isoptenoxy group.

For the crosslinking of condensation-crosslinking 2-component compositions, the hardener component is admixed immediately before use. This hardener component is preferably a tetraalkoxysilane, preferably tetraethyl or tetrapropyl silicate.

Crosslinking catalysts which are used in the condensation-crosslinking 1- and 2-component compositions are the condensation catalysts known to the expert.

Examples of condensation catalysts are butyl titanates and organic tin compounds, such as di-n-butyltin diacetate, di-n-butyltin dilaurate and reaction products of a silane containing, per molecule, as hydrolyzable groups, at least two monovalent hydrocarbon radicals which are bonded to silicon via oxygen and are optionally substituted by an alkoxy group, or an oligomer thereof, with diorganotin diacylate, all the valencies of the tin atoms in these readion products being satisfied by oxygen atoms of the grouping ≡SiOSn≡ or by SnC-bonded, monovalent organic radicals. The preparation of such reaction products is described in detail in U.S. Pat. No. 4,460,761 (issued Jul. 17, 1984, A. Schiller et al., Wacker-Chemie GmbH).

After application of the organopolysiloxane compositions, crosslinking to silicone elastomers takes place by access of atmospheric moisture.

In the case of addition-crosslinking 2-component compositions, organopolysiloxanes containing Si-bonded hydrogen atoms are used as the crosslinking agent. They are preferably of the formula

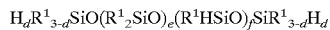

in which
R¹ has the meaning given above,
d is 0 or 1,
e is 0 or an integer having a value from 1 to 500 and
f is an integer having a value from 1 to 200,
with the proviso that on average at least 3 Si-bonded hydrogen atoms are present per molecule.

The hardener component is admixed immediately before use.

Crosslinking catalysts which are used in the case of addition crosslinking are platinum metals and/or compounds thereof, preferably platinum and/or compounds thereof. All the catalysts which have been used to date for addition of hydrogen atoms bonded directly to Si atoms onto aliphatically unsaturated compounds can be used. Examples of such catalysts are metallic and finely divided platinum, which can be on supports, such as silicon dioxide, aluminum oxide or active charcoal, and compounds or complexes of platinum, such as platinum halides, for example PtCl₄, H₂PtCl₆*6H₂O, Na₂PtCl₄*4H₂O, platinum-olefin complexes, platinum-alcohol complexes, platinum-alcoholate complexes, platinum-ether complexes, platinum-aldehyde complexes, platinum-ketone complexes, including reaction products of H₂PtCl₆*6H₂O and cyclohexanone, platinum-vinylsiloxane complexes, in particular platinum-divinyltetramethyldisiloxane complexes with or without a content of detectable organically bonded halogen, bis(gamma-picoline)platinum dichloride, trimethylene-dipyridineplatinum dichloride, dicyclopentadiene-platinum dichloride, dimethylsulfoxide-ethylene-platinum(II) dichloride and reaction products of platinum tetrachloride with olefin and primary amine or secondary amine or primary and secondary amine, such as the reaction product of platinum tetrachloride, dissolved in 1-octene, with sec-butylamine, or ammonium-platinum complexes according to EP-B 110 370.

In addition to the organopolysiloxanes, crosslinking agents and crosslinking catalysts, the compositions according to the invention can optionally comprise further substances, such as reinforcing fillers, plasticizers, such as dimethylpolysiloxanes or methylphenylpolysiloxanes which are blocked on the ends by trimethylsiloxy groups and have a viscosity of 10 to 5000 mPa•s at 25° C., preferably 35 to 1000 mPa•s at 25° C., adhesion promoters, such as organo-functional silanes or siloxanes, for example aminofunctional silanes or siloxanes, dispersing auxiliaries, pigments, fungicides and rheological additives.

Examples of reinforcing fillers having a specific BET surface area of at least 50 m²/g, are pyrogenically produced silicon dioxides and precipitated silicon dioxides. The reinforcing fillers, like the non-reinforcing fillers, can be hydrophobized by treatment with agents which render them hydrophobic, such as by treatment with stearic acid or by treatment with organosilanes, -silazanes or -siloxanes. One type of filler can be used, but it is also possible to use a mixture of at least two fillers.

The organopolysiloxane compositions which comprise the additions according to the invention are built up as follows:
(a) 10% to 80% by weight, preferably 20% to 70% by weight, of organopolysiloxane which is capable of crosslinking (b) 0% to 40% by weight, preferably 10% to 30% by weight, of plasticizer which is not capable of crosslinking (c) 0.5% to 15% by weight, preferably 3% to 10% by weight, of crosslinking agent (d) 0% to 50% by weight, preferably 3% to 10% by weight, of reinforcing filler (e) 10% to 50% by weight, preferably 20% to 40% by weight, of non-reinforcing filler (f) 0% to 10% by weight, preferably 1% to 3% by weight, of pigments (g) 0% to 2% by weight, preferably 0.01% to 1.0% by weight, of catalyst (h) 0% to 10% by weight, preferably 0.1% to 3% by weight, of adhesion promoter and (i) 0.1% to 20% by weight, preferably 0.1% to 3% by weight, of boron compound, where the sum of the constituents must be 100% by weight.

The organopolysiloxane compositions according to the invention which can be cross to flame-resistant elastomers can be used for all purposes for which organo-polysiloxanes which can be crosslinked to flame-resistant elastomers can be used, for example as joint-sealing compositions between structural components in structural and civil engineering, as a sealing composition for glazing and as sealing and embedding compositions for cable or pipe conduits through non-combustible building materials.

In the following examples, all percentage data relate to the weight unless stated otherwise.

EXAMPLE 1

The following constituents are brought together in succession in a suitable mixer:

30% of a,ω-dihydroxydimethylpolysiloxane, capable of crosslinking, viscosity of 80,000 mPa•s at 25° C.

19.9% of plasticizer, dimethylpolysiloxane containing trimethylsiloxy groups, not capable of crosslinking, viscosity of 100 mPa•s at 25° C.

6% of methyltrisbutanoneoximosilane as a crosslinking agent

3% of pyrogenic silicon dioxide acid having a specific surface area of about 150 m²/g, for example HDK V 15 from Wacker-Chemie GmbH, Munich, as a reinforcing filler 38% of calcined kaolin, for example Icecap K from Burgess Pigment Company, USA, as a non-reinforcing filler 2% of γ-aminopropyltriethoxysilane as an adhesion promoter 1% of ground boron carbide from Elektroschmelzwerke Kempten GmbH, Munich, as an additive according to the invention 0.1% of organotin catalyst for the crosslinking.

The finished composition is pale gray and can be colored in various desired shades, optionally, by suitable pigments. This non-sag consistency mixture is stored in commercially available cartridges with exclusion of moisture. The preferred use is sealing of vertical joints in buildings or ceiling joints into which the material is applied overhead.

For fire testing, the composition is introduced as a 12×12 mm wide and 500 mm long joint between 2 blocks of lightweight concrete with a circular cord of suitable material (for example closed-cell, foamed polyethylene, ceramic fibers or the like) as back-filling material, and is cured under standard climatic conditions. After initial storage for four weeks, the specimens are subjected to a burning test in a small burning furnace, such as is described in DIN 4102, part 8, in accordance with the standard burning curve according to DIN 4102, part 2. The temperature evolution in the burning space and on the reverse of the joint is recorded with 3 thermocouples. The temperatures on the reverse of the joint which are stated in Table 1, and the values on which FIG. 1 is based are the means of 2 measuring elements.

A temperature difference between the theoretical temperature of the furnace space and the reverse of the joint is a measure of the thermal insulation action of the decomposed joint composition. The appearance of the joint and the consistency of the joint composition are evaluated after a burning test for 60 minutes. The results are stated in Table 1 and FIG. 1.

Comparison Experiment 1

The same constituents as in Example 1, but without boron carbide, are mixed and subjected to testing.

Comparison Experiment 2

The same constituents as in Example 1, but with naturally occurring, ground calcium carbonate (Omya BLR3 from Omya, Cologne) instead of the aluminum silicate (calcined kaolin), are mixed and subjected to testing.

Comparison Experiment 3

The same constituents as in Comparison Experiment 2, but without boron carbide, are mixed and subjected to testing.

Comparison Experiment 4

The same constituents as in Example 1, but with hydrated aluminum oxide treated with organosilane on the surface (Maratinal OL from Martinswerke, Bergheim) instead of the aluminum silicate (calcined kaolin), are mixed and subjected to testing.

EXAMPLE 2

The following recipe constituents are brought together in succession in a suitable mixer:

66% of a,ω-dihydroxydimethylsiloxane, capable of crosslinking, viscosity of 12,000 mPa•s at 25° C.

33% of quartz flour, ground, for example Sicron SF 600 from Quarzwerke GmbH, Frechen as a non-reinforcing filler 1% of boron carbide analogous to Example 1.

This mixture is free-flowing and can be stored under normal conditions. Before use, 3% of a mixture of tetraethoxysilane and organotin catalyst is added for crosslinking and the components are mixed intensively. Free-flowing mixtures are preferred for sealing horizontal wall openings. Preparation of the test specimens for the burning experiment and the burning test are carried out analogously to Example 1.

EXAMPLE 3

The same constituents as in Example 2, but ground zirconium boride from Elektroschmelzwerke Kempten GmbH, Munich is used instead of boron carbide, are mixed and subjected to testing.

EXAMPLE 4

The same constituents as in Example 2, but ground calcium boride from Elektroschmelzwerke Kempten GmbH, Munich, is used instead of boron carbide, are mixed and subjected to testing.

Comparison Experiment 5

The same constituents as in Example 2, but without boron carbide, are mixed and subjected to testing.

TABLE 1

| Experiment | Evaluation after 60 minutes | Temperature after 60 minutes | Comments |
|---|---|---|---|
| Example 1 | Joint perfect | 331° C. | Formation of a solid foam-like material due to an increase in volume on the surface, no emergence of fire gases on the reverse of the joint |
| Comparison Experiment 1 | Joint has a few transverse cracks | 925° C.*) | No increase in volume, material is soft, fire gases emerge through the cracks |
| Comparison Experiment 2 | Joint has many transverse cracks | 925° C.*) | Decrease in volume due to decomposition, material is soft, fire gases emerge through the cracks |
| Comparison Experiment 3 | Joint has many transverse cracks | 925° C.*) | Decrease in volume due to decomposition, material is very soft, fire gases emerge through the cracks |
| Comparison Experiment 4 | No joint material remaining | 925° C.*) | The joint material has decomposed completely, fire gases emerge through numerous cracks after about 35 minutes |
| Example 2 | Joint perfect | 335° C. | Formation of a solid foam-like material due to an increase in volume on the surface, no emergence of fire gases on the reverse of the joint |
| Example 3 | Joint perfect | 342° C. | Formation of a solid foam-like material due to an increase in volume on the surface, no emergence of fire gases on the reverse of the joint |
| Example 4 | Joint perfect | 338° C. | Formation of a solid foam-like material due to an increase in volume on the surface, no emergence of fire gases on the reverse of the joint |
| Comparison Experiment 5 | Joint has a few transverse cracks | 925° C.*) | No increase in volume, material is soft, fire gases emerge through the cracks |

*)As a result of the transverse cracks which have occurred and the resulting emergence of the fire gases on the reverse of the joint during fire testing, the theoretical temperature of the furnace interior and the reverse of the joint at the end of the experiment after 60 minutes are the same.

What is claimed is:

1. A method of preparing a flame-resistant silicone elastomer by crosslinking a condensation-crosslinking composition containing an organopolysiloxane bearing silicon-bonded hydroxy groups, $C_{1-4}$ alkoxy groups, or mixtures thereof as condensation-crosslinkable groups; with a crosslinking agent reactive therewith, the composition further containing a boron compound selected from the group consisting of boron carbide, metal borides, and mixtures thereof, and a non-reinforcing filler of which at least 75 weight percent is heat-stable at temperatures up to 1200° C., and optionally a plasticizer which is not capable of crosslinking.

2. The method of claim 1, wherein said elastomer is a non-foam elastomer which foams to a mechanically stable foam upon exposure to fire.

3. The method of claim 1, wherein said boron carbide and metal boride are in the form of ground solids.

4. The method of claim 1, wherein said organopolysiloxane bearing silicon-bonded hydroxy or $C_{1-4}$ alkoxy groups or mixtures thereof comprises one or more organopolysiloxanes of the formula:

$$XR_2SiO(R_2SiO)_n SiR_2X \qquad (I)$$

in which

R is identical or different, monovalent, optionally substituted hydrocarbon radicals having 1 to 18 carbon atoms per radical, x independently is a hydroxyl group or a $C_{1-4}$ alkoxy group n is an integer of at least 10.

5. The method of claim 1, wherein said crosslinking agent comprises one or more of a) a tetraalkoxysilane; or b) a silane of the formula $$R_xSiZ_{4-x}$$

or partial hydrolysates thereof, wherein

R is identical or different, monovalent, optionally substituted hydrocarbon radicals having 1 to 18 carbon atoms per radical, x is 0 or 1 and Z is an identical or different hydrolyzable group selected from the group consisting of acyloxy groups —$OCOR^2$ optionally substituted hydroxycarbonoxy groups —$OR^3$ amino groups —$NR^4_2$ oxime groups —ON=A amide groups

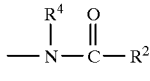

aminoxy groups —O—$NR^4_2$ enoxy groups

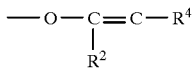

in which $R^2$ is a monovalent hydrocarbon radical having 1 to 12 carbon atoms, $R^3$ is a monovalent hydrocarbon radical having 1 to 4 carbon atoms, $R^4$ is a hydrogen or identical or different, monovalent hydrocarbon radicals having 1 to 12 carbon atoms and A is identical or different radicals of the formula $$R^5_2C= \text{ or } R^6C=$$

in which $R^5$ is identical or different, monovalent hydrocarbon radicals having 1 to 5 carbon atoms per radical and $R^6$ is a divalent hydrocarbon radical having 5 to 6 carbon atoms per radical.

6. The method of claim 1, wherein said condensation-crosslinking composition further comprises a condensation catalyst.

7. The method of claim 1, wherein said elastomer, prior to crosslinking, contains, based on percent by weight of the total composition, 10% to 80% crosslinkable organopolysiloxane;

10% to 30% plasticizer which is not capable of crosslinking;

0.5% to 15% of crosslinking agent; and 0.1 to 20% by weight of boron compound.

8. The method of claim 1, wherein a plasticizer is present, the plasticizer comprising trimethylsiloxy-terminated polydimethylsiloxanes or trimethylsiloxy-terminated polymethylphenylsiloxanes.

9. A method for preparing organopolysiloxane compositions which when crosslinked form flame-resistant non-foam elastomers comprising:

adding to the organopolysiloxane which is crosslinkable to form elastomers, 0.1 to 3 weight percent, based on the total weight of the elastomer, of one or more boron compounds selected from the group consisting of boron carbide and a metal boride, and a non-reinforcing filler, with the proviso that at least 75% by weight of the non-reinforcing filler is heat-stable at temperatures of up to 1200° C.

10. The method of claim 9, said method further comprising adding a plasticizer which is non-crosslinkable.

11. The method of claim 10, wherein the plasticizer comprises trimethylsiloxy-terminated polydimethylsiloxanes and trimethylsiloxy-terminated polymethylphenylsiloxanes.

12. A method for preparing organopolysiloxane compositions which when crosslinked form flame-resistant non-foam elastomers comprising:

adding to the organopolysiloxane which is crosslinkable to form elastomers, from 0.1 to 3 weight percent, based on the total weight of the elastomer, of one or more boron compounds selected from the group consisting of boron carbide and a metal boride, and a non-reinforcing filler, with the proviso that at least 75% by weight of the non-reinforcing filler is heat-stable at temperatures of up to 1200° C., said boron compounds being in the form of ground solids.

13. The method of claim 12, said method further comprising adding a plasticizer which is non-crosslinkable.

14. The method of claim 12, wherein the plasticizer is one or more of trimethylsiloxy-terminated polydimethylsiloxanes and trimethylsiloxy-terminated polymethylphenylsiloxanes.

15. A method for preparing addition-crosslinkable organopolysiloxane compositions which when crosslinked form flame-resistant non-foam elastomers, comprising:

adding, to a composition containing organopolysiloxanes crosslinkable to form elastomers, one or more boron compounds selected from the group consisting of boron carbide and a metal boride, and a non-reinforcing filler, wherein at least 75% by weight of the non-reinforcing filler is heat-stable at temperatures of up to 1200° C., said composition optionally containing reinforcing fillers, plasticizers, adhesion promoters, dispersing auxiliaries, pigments, fungicides, and rheological additives, with the proviso that said organopolysiloxane which is crosslinkable consists essentially of:

a) organopolysiloxanes which contain aliphatic carbon—carbon multiple bonds of the formula:

$$Y_a R^1_{3-a} SiO(R^1_2 SiO)_b (R^1 YSiO)_c SiR^1_{3-a} Y_a \qquad (II)$$

in which $R^1$ is identical or different, monovalent, optionally substituted hydrocarbon radicals having 1 to 18 carbon atoms per radical, Y is a monovalent hydrocarbon radical with an aliphatic carbon—carbon multiple bond, a is 0 or 1, b is an integer having a value from 20 to 10,000, c is 0 or an integer having a value from 1 to 300, the organopolysiloxane (II) optionally containing siloxane units of the formulae $R^1 SiO_{3/2}$, $R^1_3 SiO_{1/2}$, and $SiO_{4/2}$; and b) organopolysiloxanes bearing silicon bonded hydrogen, of the formula:

$$H_d R^1_{3-d} SiO(R^1_2 SiO)_e (R^1 HSiO)_f SiR^1_{3-d} H_d$$

in which $R^1$ has the meaning given above, d is 0 or 1, e is 0 or an integer having a value from 1 to 500 and f is an integer having a value from 1 to 200.

16. A flame-resistant elastomer, consisting of the reaction product of:

a) 10% to 80% by weight of an organopolysiloxane which is capable of condensation-crosslinking;

b) 0% to 40% by weight of a plasticizer which is not capable of crosslinking;

c) 0.5% to 15% by weight of a condensation crosslinking agent;

d) 0% to 50% by weight of a reinforcing filler;

e) 10% to 50% by weight of a non-reinforcing filler;

f) 0% to 10% by weight of a pigment;

g) 0% to 2% by weight of a catalyst capable of promoting crosslinking;

h) 0% to 10% by weight of an adhesion promoter; and i) 0.1% to 3% by weight of one or more boron compounds selected from the group consisting of boron carbide and metal borides.

17. The flame-resistant elastomer of claim 16, consisting of the reaction product of:

a) 20% to 70% by weight of an organopolysiloxane which is capable of condensation crosslinking;

b) 10% to 30% by weight of a plasticizer which is not capable of crosslinking;

c) 3% to 10% by weight of a condensation crosslinking agent;

d) 3% to 10% by weight of a reinforcing filler;

e) 20% to 40% by weight of a non-reinforcing filler;

f) 0% to 10% by weight of a pigment;

g) 0% to 2% by weight of a catalyst capable of promoting crosslinking;

h) 0% to 10% by weight of an adhesion promoter; and i) 0.1% to 3% by weight of one or more boron compounds selected from the group consisting of boron carbide and metal borides.

18. A flame-resistant elastomer, consisting of the reaction product of:

a) 20% to 70% by weight of an organopolysiloxane which is capable of addition-crosslinking;

b) 10% to 30% by weight of a plasticizer which is not capable of crosslinking;

c) 3% to 10% by weight of a crosslinking agent;

d) 3% to 10% by weight of a reinforcing filler;
e) 20% to 40% by weight of a non-reinforcing filler;
f) 0% to 10% by weight of a pigment;
g) 0% to 2% by weight of a catalyst capable of promoting crosslinking;
h) 0% to 10% by weight of an adhesion promoter; and
i) 0.1% to 3% by weight of one or more boron compounds selected from the group consisting of boron carbide and metal borides.

19. A flame-resistant crosslinked, non-foam organopolysiloxane elastomer containing one or more boron compounds selected from the group consisting of boron carbide and metal borides, and a non-reinforcing filler of which 75 weight percent is heat-stable at temperatures up to 1200° C., said elastomer further characterized by foaming into a mechanically stable foam when exposed to fire.

\* \* \* \* \*